US009538494B2

(12) United States Patent
Puthenpura et al.

(10) Patent No.: US 9,538,494 B2
(45) Date of Patent: Jan. 3, 2017

(54) TIME DISTANCE OF ARRIVAL BASED MOBILE DEVICE LOCATION DETECTION WITH DISTURBANCE SCRUTINY

(71) Applicant: AT&T Intellectual Property I, L.P., Atlanta, GA (US)

(72) Inventors: Sarat Puthenpura, Berkeley Heights, NJ (US); Jie Chen, Watchung, NJ (US); Sam Houston Parker, Cranbury, NJ (US); Huahui Wang, Bridgewater, NJ (US); Wenjie Zhao, Princeton, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 494 days.

(21) Appl. No.: 14/090,166

(22) Filed: Nov. 26, 2013

(65) Prior Publication Data

US 2015/0148059 A1    May 28, 2015

(51) Int. Cl.
*H04W 24/00* (2009.01)
*H04W 64/00* (2009.01)
*G01S 5/10* (2006.01)

(52) U.S. Cl.
CPC ............. *H04W 64/00* (2013.01); *G01S 5/10* (2013.01)

(58) Field of Classification Search
CPC ...... H04W 64/00; H04W 4/02; H04W 56/006; H04W 64/003; G01S 5/10; G01S 5/06; G01S 5/0036
USPC ............ 455/456.1, 456.2, 456.3, 457, 404.2
See application file for complete search history.

(56) References Cited

U.S. PATENT DOCUMENTS

| 5,600,706 A | 2/1997 | Dunn et al. |
| 5,613,205 A | 3/1997 | Dufour |
| 6,026,305 A | 2/2000 | Salinger et al. |

(Continued)

FOREIGN PATENT DOCUMENTS

| AU | 2007299915 B2 | 3/2008 |
| JP | 62291582 A | 12/1987 |
| WO | 2006135542 | 12/2006 |

OTHER PUBLICATIONS

James J. Caffery, Jr. "A New Approach to the Geometry of TOA Location." Vehicular Technology Conference, 2000. IEEE-VTS Fall VTC 2000. 52nd (vol. 4) Sep. 24, 2000-Sep. 28, 2000, pp. 1943-1949.

(Continued)

*Primary Examiner* — Thai Vu
(74) *Attorney, Agent, or Firm* — Amin, Turocy & Watson, LLP

(57) ABSTRACT

Techniques for locating a mobile device using a time distance of arrival (TDOA) method with disturbance scrutiny are provided. In an aspect, for respective combinations of three base station devices of a number of base station devices greater than or equal to three, intersections in hyperbolic curves, generated using a closed form function with input values based on differences of distances from the device to pairs of base station devices of the respective combinations of three base station devices, are determined. The intersection points are then tested for robustness against measurement errors associated with the input values and a subset of the intersection points that are associated with a degree of resistance to the measurement errors are selected to estimate a location of the device.

20 Claims, 13 Drawing Sheets

(56) References Cited

U.S. PATENT DOCUMENTS

| | | | |
|---|---|---|---|
| 6,148,211 A * | 11/2000 | Reed | H04W 64/00 |
| | | | 455/456.2 |
| 6,230,018 B1 * | 5/2001 | Watters | G01S 5/02 |
| | | | 340/988 |
| 6,671,514 B1 | 12/2003 | Cedervall et al. | |
| 6,717,547 B2 | 4/2004 | Spilker, Jr. et al. | |
| 7,110,774 B1 | 9/2006 | Davis et al. | |
| 7,127,257 B2 | 10/2006 | Riley et al. | |
| 7,315,745 B2 | 1/2008 | Duffett-Smith et al. | |
| 7,319,878 B2 | 1/2008 | Sheynblat et al. | |
| 7,848,733 B2 | 12/2010 | Bull et al. | |
| 7,957,753 B2 | 6/2011 | Timiri et al. | |
| 8,010,079 B2 | 8/2011 | Mia et al. | |
| 8,311,557 B2 | 11/2012 | Annamalai | |
| 8,421,277 B2 | 4/2013 | Luck et al. | |
| 2004/0166856 A1 | 8/2004 | Niemenmaa | |
| 2005/0075099 A1 | 4/2005 | Guyot | |
| 2005/0192029 A1 | 9/2005 | Aigner et al. | |
| 2006/0194594 A1 | 8/2006 | Ruutu et al. | |
| 2006/0293066 A1 | 12/2006 | Edge et al. | |
| 2008/0117106 A1 * | 5/2008 | Sarno | G01S 5/06 |
| | | | 342/444 |
| 2009/0160710 A1 * | 6/2009 | Hwang | G01S 5/10 |
| | | | 342/387 |
| 2009/0285162 A1 | 11/2009 | Xie et al. | |
| 2013/0190006 A1 | 7/2013 | Kazmi et al. | |
| 2015/0208198 A1 * | 7/2015 | Duan | H04W 64/00 |
| | | | 455/456.2 |

OTHER PUBLICATIONS

Cheung et al. "Least Squares Algorithms for Time-of-Arrival-Based Mobile Location." IEEE Transactions on Signal Processing, vol. 52, No. 4, April 2004, pp. 1121-1128.

Cong et al. "Non-Line-of-Sight Error Mitigation in TDOA Mobile Location." Global Telecommunications Conference, 2001. GLOBECOM '01. IEEE, Nov. 25, 2001-Nov. 29, 2001, pp. 680-684.

Cong et al. "Hybrid TDOA/AOA Mobile User Location for Wideband CDMA Cellular Systems." IEEE Transactions on Wireless Communications, vol. 1, No. 3, Jul. 2002, pp. 439-447.

Urruela et al. "Novel Closed-Form ML Position Estimator for Hyperbolic Location." IEEE International Conference on Acoustics, Speech, and Signal Processing, 2004. Proceedings. (ICASSP '04) (vol. 2 ) May 17-21, 2004, pp. 149-152.

* cited by examiner

700

| |
|---|
| STEP 1 • Given measurements $d_{ji}$ and $d_{ki}$ from two pairs of cells $(i, j)$ and $(i, k)$. |
| STEP 2 • Perform hyperbola calculations. If no interactions are found, go to step 1 to investigate measurements from other pairs of cells. Otherwise if there are interactions, and without loss of generality assuming two positions located in coordinates $(x_1, y_1)$ and $(x_2, y_2)$, continue to Step 3. |
| STEP 3 • Introduce a small measurement disturbance/error $\varepsilon > 0$ to $d_{ji}$, i.e., let $\hat{d}_{ji} = d_{ji} + \varepsilon$. Perform hyperbola algorithm on $\hat{d}_{ji}$ and $d_{ki}$. If no interactions are found, go to step 1 to investigate measurements from other pairs of cells. Otherwise if there are any interactions, and without loss of generality assuming two positions located in coordinates $(\hat{x}_1, \hat{y}_1)$ and $(\hat{x}_2, \hat{y}_2)$, continue to Step 4. |
| STEP 4 • Check if $\min_i \{\sqrt{(\hat{x}_i - x_1)^2 + (\hat{y}_i - y_1)^2}\} > T_\varepsilon$, where $T_\varepsilon$ is an empirical error tolerance threshold obtained from various tests. If this threshold is exceeded, $(x_1, y_1)$ is determined to be disturbance sensitive; otherwise non-sensitive. Do the same checking and labeling for $(x_2, y_2)$ as well. |
| STEP 5 • If both $(x_1, y_1)$ and $(x_2, y_2)$ are labeled as sensitive, go to step 1 to investigate measurements from other pairs of cells. Otherwise, perform Step 3 to 4 on non-sensitive result(s) by changing $\varepsilon$ to $-\varepsilon$. If there are any results remaining non-sensitive, continue to Step 6. |
| STEP 6 • Perform Step 3 to Step 5 but this time introduce disturbances to $d_{ki}$ instead, and keep $d_{ji}$ intact. Any of $(x_1, y_1)$ and $(x_2, y_2)$ that is labeled as non-sensitive after all these steps would be regarded as a disturbance survivor, and will be passed to the RMS calculation later on. |
| STEP 7• Repeat steps 1-6 until cell pairs are exhausted by the disturbance scrutiny. |
| STEP 8• Apply RMS analysis against all surviving non-sensitive intersection points. |

FIG. 7

TIME DISTANCE OF ARRIVAL BASED MOBILE DEVICE LOCATION DETECTION WITH DISTURBANCE SCRUTINY

TECHNICAL FIELD

This disclosure relates generally to determining a location of a mobile device using a time distance of arrival calculation method with disturbance scrutiny.

BACKGROUND

In wireless mobile networks, the capability of precisely positioning user equipments (UEs) is desired in a wide range of applications such as navigation, location-based services, and emergency support. Although global positioning systems (GPS) or assisted-GPS (AGPS) can provide rather accurate estimates of UE positions for devices with installed GPS, high power consumption and a stringent requirement on line-of-sight (LOS) satellite transmission refrain their usage in many situations. For AGPS systems, the LOS requirement may be relieved to some extent. However, the heavy traffic burden on the network (when they access the assistance servers) decreases the effect of any alleviation.

BRIEF DESCRIPTION OF THE DRAWINGS

FIG. 7 presents another flow chart of an example process for determining a location of a mobile device using a TDOA calculation method with disturbance scrutiny in accordance with various aspects and embodiments described herein.

DETAILED DESCRIPTION

Figure 1:
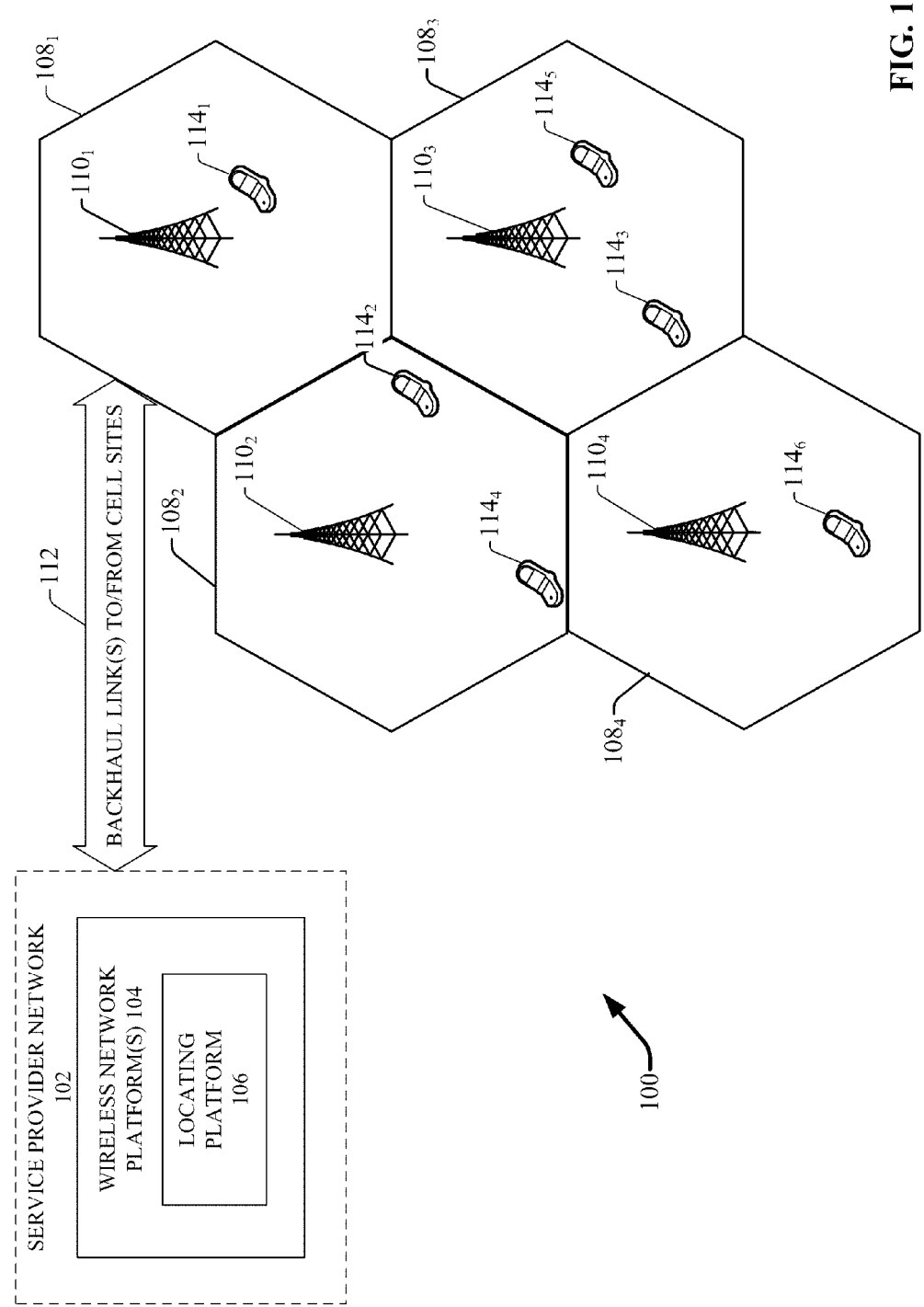
FIG. 1 illustrates a schematic wireless network environment that can operate, in accordance with various aspects and embodiments described herein.

The various embodiments are described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and components are shown in block diagram form in order to facilitate describing the various embodiments.

One way to locate user equipments (UEs) has been to use inherent radio measurements, which are constantly reported from mobile devices when they are connected, without causing extra traffic burden to the network. The time difference of arrival (TDOA) method among them has been popular due to its simplicity. Its accuracy, however, can be easily impaired by measurement errors from various sources that are difficult to eliminate, such as non-line-of-sight (NLOS) propagation errors, quantization errors and/or calibration errors.

By way of further introduction, the disclosed subject matter provides an efficient and robust set of embodiments to position UEs in wireless mobile networks, such as universal mobile telecommunication systems (UMTS), taking advantage of inherent radio measurement reports from mobile devices. The various embodiments can utilize TDOA to estimate difference of distances from a UE to detected cells for hyperbolic positioning.

As previously noted, conventional TDOA methods for UE positioning can be easily impaired by measurement errors from various sources such as non-line-of-sight (NLOS) propagation errors, quantization errors and/or calibration errors. The subject disclosure introduces a robust set of systems and processes that provide accurate TDOA based UE location results even in the presence of persistent errors. The various embodiments employ a hyperbolic positioning method with "disturbance scrutiny" to enhance the conventional TDOA processes to protect against such errors. As discussed in greater detail supra, the "disturbance scrutiny" aspect of the various embodiments herein involves deliberately introducing a "disturbance" (e.g., a known error value) into the measurement inputs for the TDOA processes and then checking the robustness of the results. Unreliable results are discarded and reliable ones are compared by their root mean square (RMS) values to obtain a solution better reflective of the UE's position than conventional techniques. The various embodiments are effective, in the sense that UE positioning accuracy is significantly increased without sacrificing computational speed.

In one embodiment, a system is provided that includes a memory to store executable instructions and a processor, coupled to the memory, that facilitates execution of the executable instructions to perform various operations. These operations include receiving, from a device, signal information indicating a difference in arrival time of signals that were received by the device from a number of base station devices, wherein the number is an integer greater than or equal to three. For respective combinations of three base station devices of the number of base station devices, operations are performed that include generating curve information representing hyperbolic curves generated using a closed form function with input values based on differences of distances from the device to pairs of base station devices of the respective combinations of three base station devices, wherein the differences of distances are based on the signal information and location information for the number of base station devices, and determining intersection points in the hyperbolic curves for the respective combinations of three base station devices. The operations further include selecting a subset of the intersection points that are associated with a degree of resistance to measurement errors associated with the input values.

In another embodiment a method is disclosed that includes receiving, by a system having a processor, signal information indicating a difference in arrival time of signals that were received by a device from a number of base station devices, wherein the number is an integer greater than or equal to three. For respective combinations of three base station devices of the number of base station devices, the method further includes, determining, by the system, differences of distances from the device to pairs of base station devices of the respective combinations of three base station devices based on the signal information and location information for the number of base station devices, generating, by the system, curve information representing hyperbolic curves generated using a closed form function with input values based on the differences of distances, and determining, by the system, intersection points in the hyperbolic curves. The method further includes selecting, by the system, a subset of the intersection points that are associated with a determined degree of resistance to measurement errors associated with the input values.

In yet another embodiment, disclosed is a tangible computer readable medium comprising computer executable instructions that, in response to execution, cause a system to perform various operations. These operations include receiving, from a device, signal information indicating a difference in arrival time of signals that were received by the device from a set of base station devices comprising at least three base stations. For respective combinations of three base station devices of the set of base station devices, the operations further include, generating curve information representing hyperbolic curves generated using a closed form function with input values based on differences of distances from the device to pairs of base station devices of the respective combinations of three base station devices, wherein the differences of distances are based on the signal information and location information for the set of base station devices, and determining intersection points in the hyperbolic curves for the respective combinations of three base station devices. The operations further include selecting a subset of the intersection points that are associated with a determined degree of resistance to measurement errors associated with the input values, and determining a location of the device based on the subset of the intersection points.

With reference to the drawings, FIG. 1 is an exemplary wireless network environment 100 that can operate in accordance with aspects described herein. Wireless network environment 100 can employ various cellular technologies. For example, wireless network 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), orthogonal frequency division multiple access (OFDMA), single-carrier FDMA (SC-FDMA), etc.

Wireless network environment 100 illustrates a set of wireless network macro cells $108_1$-$108_4$ configured to serve one or more UEs $114_1$-$114_6$. Although four macro cells are depicted, it should be appreciated that wireless cellular network deployments can encompass any number of macro cells, for example, $10^4$-$10^5$ coverage macro cells. However, the disclosed UE locating mechanisms specifically related to a wireless network having three or more macro cells. Any combination of three distinct macro cells can constitute a cell triplet. For example, macros cell $108_1$, $108_2$ and $108_3$, can constitute a first cell triplet, and macro cells $108_2$, $108_3$, and $108_4$ can constitute and another cell triplet. Coverage macro cells $105_\lambda$ ($\lambda=1$, 2, 3) are illustrated as hexagons; however, coverage cells can adopt other geometries generally dictated by a deployment configuration or floor plan, geographic areas to be covered, and so on.

Macro cells 10 macro cells $108_1$-$108_4$, are served respectively through NodeBs $110_1$-$110_4$, also referred to herein as based station devices. Any combination of three base station devices can constitutes a base station triplet. It is noted that radio component(s) are functionally coupled through links such as cables (e.g., RF and microwave coaxial lines), ports, switches, connectors, and the like, to a set of one or more antennas that transmit and receive wireless signals (not illustrated). It is also noted that a radio network controller (not shown), which can be a part of mobile network platform(s) 108 and base stations that serve respective macro cells; electronic circuitry or components associated with the base stations devices; and respective wireless links between UEs $114_1$-$114_6$ based station devices $110_1$-$110_4$ operated in accordance to a radio technology, form a macro radio access network (RAN). It is further noted, that based on network features, the radio controller can be distributed among the set of base stations or associated radio equipment. In an aspect, for UMTS-based networks, wireless links between UEs $114_1$-$114_6$ and based station devices $110_1$-$110_4$ embody a Uu interface (UMTS Air Interface).

Mobile network platform(s) 104 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition telecommunication can exploit various frequency bands, or carriers, which include any electromagnetic (EM) frequency bands licensed by the service provider (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands).

In addition, wireless network platform(s) 104 can control and manage base stations $110_\lambda$, and radio component(s) associated thereof, in disparate macro cells $108_\lambda$ by way of, for example, a wireless network management component (e.g., radio network controller(s), cellular gateway node(s), etc.). Wireless network platform(s) 104 can include locating platform 106 to facilitate the disclosed network based UE locating mechanisms. Moreover, wireless network platform(s) can integrate disparate networks (e.g., femto network(s), Wi-Fi network(s), femto cell network(s), broadband network(s), service network(s), enterprise network(s), . . . . ) In cellular wireless technologies (e.g., 3rd generation partnership project (3GPP) universal mobile telecommunication system (UMTS), global system for mobile communication (GSM)), wireless network platforms 104 is embodied in a core service provider network 102 and a set of radio network controllers.

In addition, wireless backhaul link(s) 112 can include wired link components like T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 112 embodies IuB interface.

It should be appreciated that while exemplary wireless network environment 100 is illustrated for macro cells and macro base stations, aspects, features and advantages of the disclosed subject matter can be implemented in microcells, picocells, femto cells, or the like, wherein base stations are embodied in home-based access points.

Figure 2:
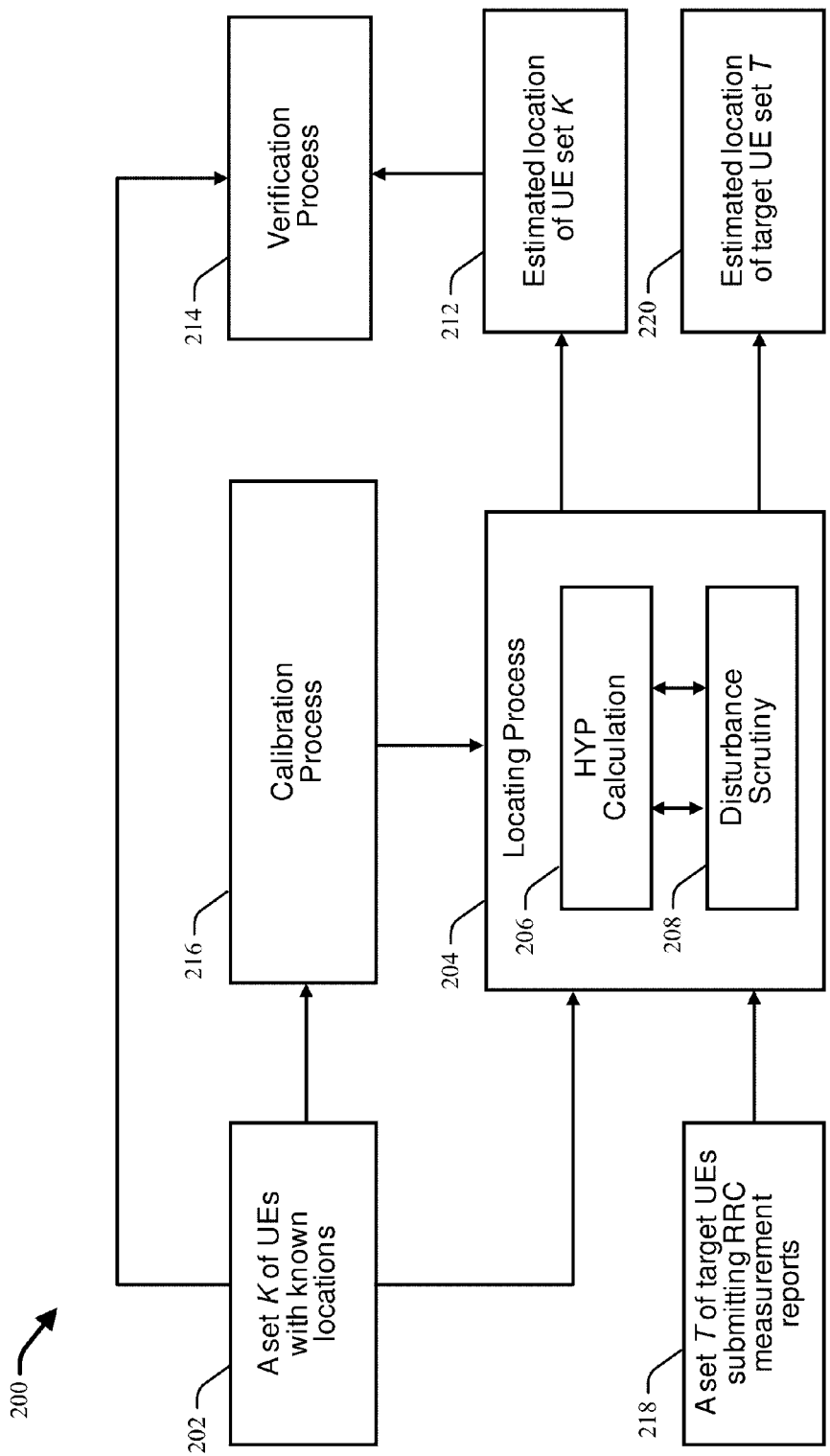
FIG. 2 presents high level diagram of an example process for determining a location of a mobile device using a time difference of arrival (TDOA) calculation method with disturbance scrutiny in accordance with various aspects and embodiments described herein.

Referring now to FIG. 2, presented is an overview of example process for determining a location of a mobile device using TDOA hyperbola calculations with disturbance scrutiny in accordance with various aspects and embodiments disclosed herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

TDOA measurement data refers to signal information indicating a difference in arrival time of signals that were received by a UE from different cells/base station devices. TDOA translates into difference of distances from a UE position to two distinct cell/base station locations. Therefore, the UE positioning problem can be reduced into finding the intersections of hyperbolic curves. There exists simple closed form solutions for determining the intersections of two hyperbolas when the base stations/cells are on a two dimensional (2D) plane. There are also three-dimensional (3D) closed form solutions, which however require information such as antenna heights and terrain altitudes. The subject disclosure focuses on 2D positioning solutions. However, various aspects described herein can easily be extended to 3D positioning models.

The difference of distances from a UE position to two known cell locations is determined using TDOA measurement data received from the UE. However, due to measurement report errors, multiple hyperbolas defined by TDOA measurements, (e.g., where the number of base station devices is greater than three), usually have no common intersection. The problem is more severe in UMTS systems. As the UMTS network is asynchronous in the sense that cells are not synchronized, a calibration process is therefore needed to provide the clock difference between two cells. In fact, this calibration is needed repeatedly over time since the clock difference may drift over time. Due to the Non-LOS propagation error and limited data resource for calibration to reflect clock drifting, the measured time reports and estimated clock difference contain errors which could result in more significant measurement errors than synchronized code division multiple access (CDMA).

Locating process 200 employs an enhanced TDOA locating method to determine an estimated location of a mobile UE. The proposed systems and method include two major components, referred to herein as hyperbola calculation 206 and disturbance scrutiny 208, the details of which shall be described in greater detail supra with respect to FIGS. 3-7. Locating process 200 also involves a calibration process 216 to facilitate calibrating clock differences between two cells/base station devices associated with inputs employed in the TDOA locating processes. This calibration process particularly addresses calibration errors in UMTS systems to guarantee high positioning accuracy.

In order to determine estimated UE locations, locating process 200 employs as input data, radio resource control (RRC) measurement reports received from a set T of target mobile UEs at 218. The RRC measurement reports include measurement data sent from mobile UEs (e.g., UEs $114_1$-$114_\mu$) to the service provider network (e.g., service provider network 102) and collected by the respective mobile UEs to facilitate cell selection and handover. An RRC measurement report received from a UE can include measurement data indicating a difference in arrival time of signals that were received by the UE from a number of surrounding station devices. For example, with reference to wireless network environment 100, an RRC measurement report received from UE $114_2$ could include data indicating a difference in arrival time of signals that were received by the UE from base station devices $110_1$, $110_2$, $110_3$, and $110_4$.

For each UE in set T, using the data indicating difference in arrival time of signals received from various surrounding base station devices (e.g., at least three based station devices), locating process 204 is applied. Locating process 204 includes performing TDOA hyperbola calculations at step 206 and applying a disturbance scrutiny technique at step 208 against outputs of the TDOA hyperbola calculations. Locating process 204 further employs as inputs, clock differences between the respective base station devices, determined via calibration process 216, and location information identifying known locations of the respective base station device (e.g., as gathered from a pre-populated database). An estimated location of the UE based on locating process 204 is output at 220.

Calibration process 216 is employed to calibrate various inputs of the TDOA locating process employed in association with locating process 204. In particular, calibration process 216 is employed to estimate the clock differences between different base station devices associated with RRC measurements received from the UEs of set T. In an aspect, calibration process 216 employs a set of K UEs for which their respective locations are known. For example, the known locations of the UEs included in set K could have been determined using GPS, assisted GPS (AGPS), or other reliable methods. At 202, RRC reports and know positions of these UEs are fed into calibration process 216, to estimate the clock differences between different cells or base station devices. The calibration process involves using measurement data from the RRC reports for each UE in set K and determining estimated locations for each of the UEs in set K using locating process 204. Estimated locations for the UEs in set K are output at 212. The estimated locations of the UEs in set K are compared with their respective known positions in the verification process 214 to measure errors between their estimated locations and their known locations.

Figure 3:
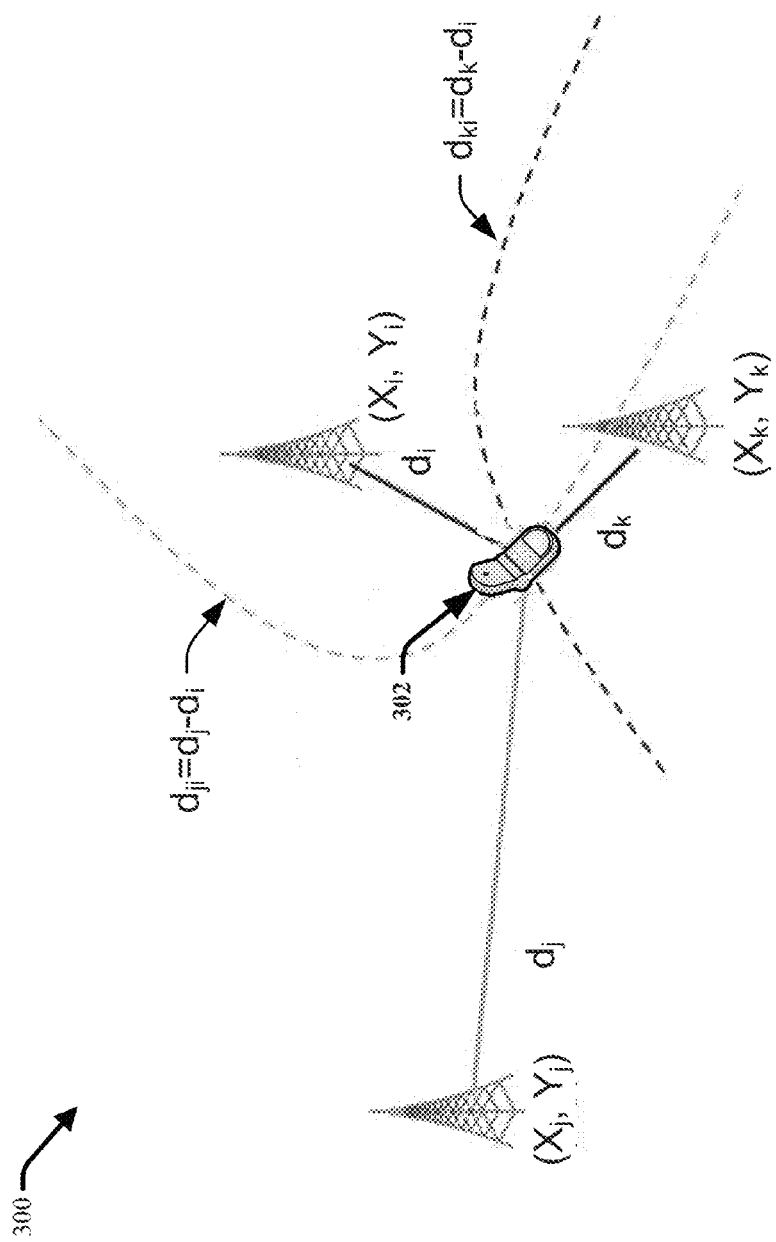
FIG. 3 demonstrates an example graphical representation of hyperbolas generated based on TDOA measurement in accordance with various aspects described herein.
Figure 4:
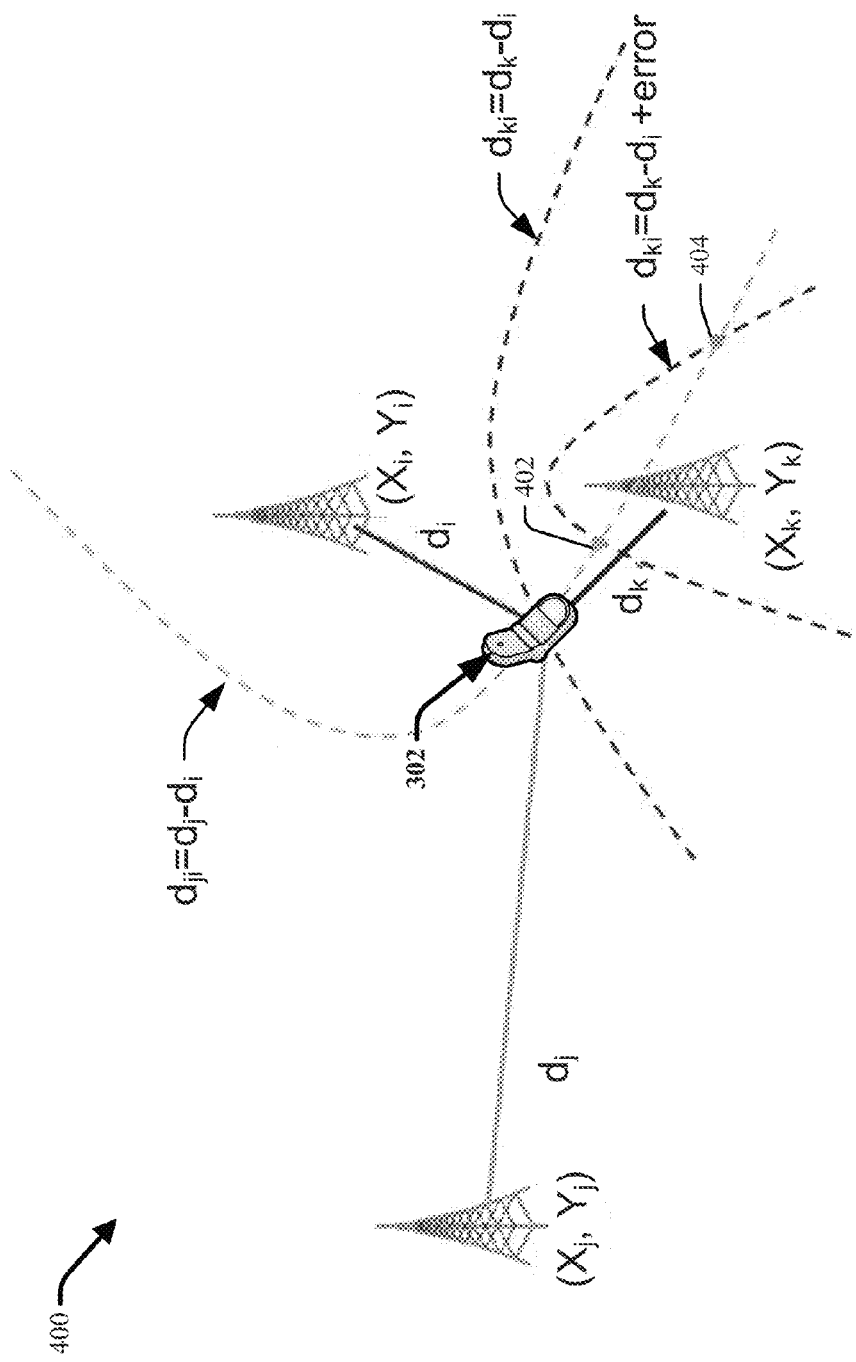
FIG. 4 demonstrates another example graphical representation of hyperbolas generated based on TDOA measurement in accordance with various aspects described herein.
Figure 5:
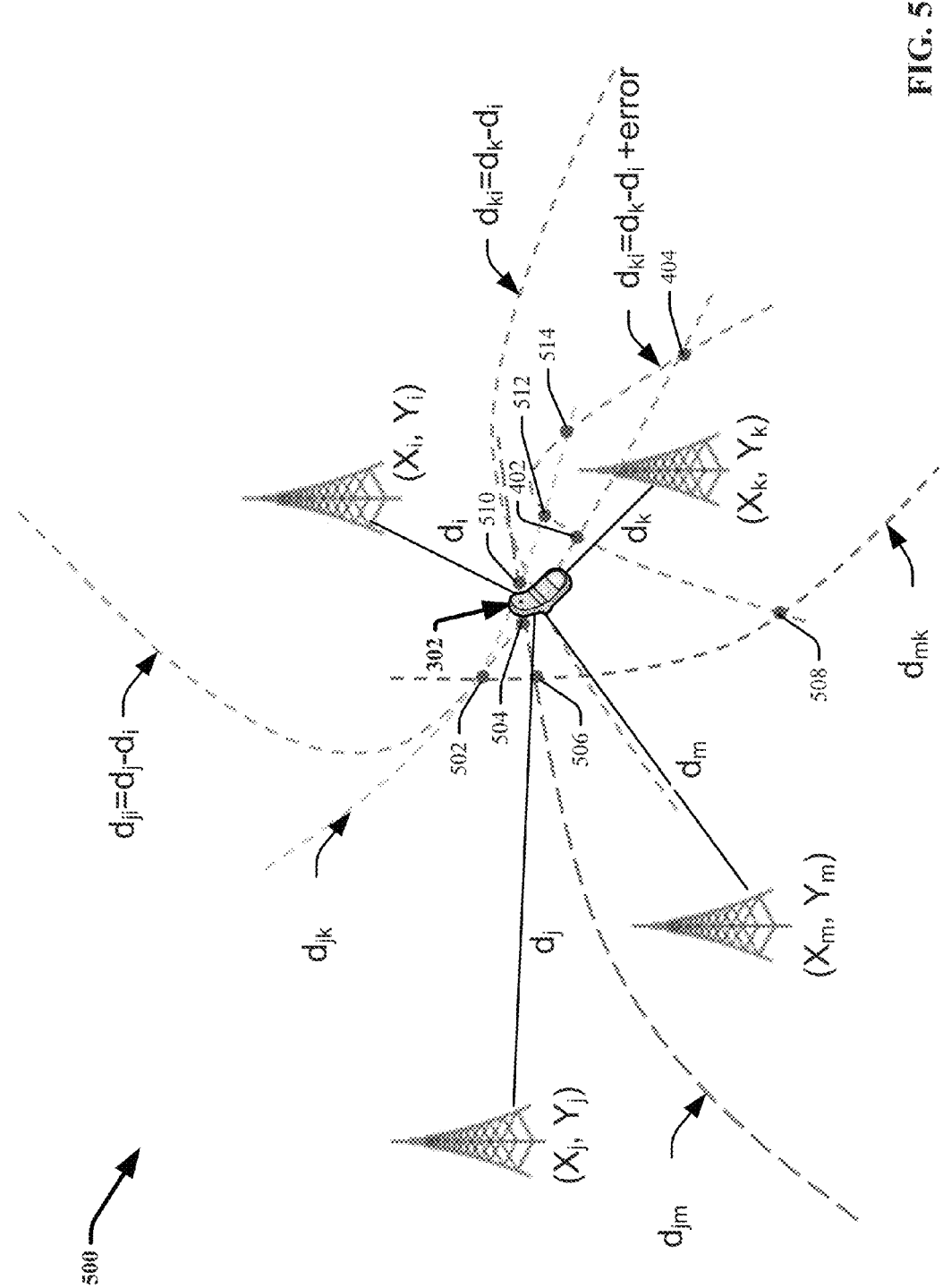
FIG. 5 demonstrates another example graphical representation of hyperbolas generated based on TDOA measurement in accordance with various aspects described herein.

FIGS. 3-5 present graphical representations of hyperbolas generated based on TDOA measurement data by a UE. FIGS. 3-5 demonstrate how hyperbola calculations based on TDOA measurement data received from a UE can be employed to determine an estimated location of the UE. FIG. 3 demonstrates hyperbolas resulting from a hypothetical hyperbola calculation for a UE without measurement/calibration errors. FIGS. 4 and 5 demonstrate hyperbolas resulting from inaccuracies associated with hyperbola calculations for the UE with measurement/calibration errors. Repetitive description of like elements employed in respective embodiments of systems, processes and devices described herein are omitted for sake of brevity.

With reference now to FIG. 3, presented is a graphical representation 300 of hyperbolas generated based on TDOA measurement data by a UE 302 from three distinct base station devices $(X_j, Y_j)$, $(X_i, Y_i)$, and $(X_k, Y_k)$. As previously noted, the TDOA method can be used in mobile networks to determine estimated UE locations. The key of the TDOA method is to compute the time difference of signals traveling from pairs of cells to the UE using arrival times of the signals received from different cells and clock differences between the respective pairs of cells (e.g., as determined via calibration process 216). The difference of distances from the UE to respective pairs of cells can then be obtained by multiplying an observed time difference with the speed of light. Since a hyperbola is defined as the locus of points with a constant distance difference from two fixed points, the UE location is represented by the intersection of two hyperbolas formed by three distinct cells. As seen in FIG. 3, the location of UE 302 is represented by the intersection of hyperbolas $(d_{ji}=d_j,-d_i)$ and $(d_{ki}=d_k,-d_i)$.

For example, using the TDOA method, hyperbolas $(d_{ji}=d_j,-d_i)$ and $(d_{ki}=d_k,-d_i)$ are generated as follows. Denote $t_i$ and $d_i$ as UE's 302 travel time and its distance to cell i, whose coordinates are $(X_i, Y_i)$, i=1, 2, . . . . It is hard to obtain the actual value of $t_i$ due to the asynchronous clocks between the UE 302 and cells associated with base stations i, k, and j. However, the time difference $t_{ij}:=t_i-t_j$ for i, j=1, 2, . . . could be derived from the clock difference between cells (calibration value) and the $T_m$ value recorded in the RRC report received from UE 302. Therefore the distance difference, denoted as $d_{ij}$, is computed as $d_{ij}t_{ij}=\times v$, where v is the speed of light. Given the differences of distances from the UE to any three cells i, j, k=1, 2, . . . , the UE location $(X_\mu, Y_\mu)$, must satisfy the following two hyperbola equations:

$$d_{ki} = d_k - d_i \quad \text{(Eq. 1)}$$
$$= \sqrt{(x_u - x_k)^2 + (y_u - y_k)^2} - \sqrt{(x_u - x_i)^2 + (y_u - y_i)^2},$$

and $$d_{ji} = d_j - d_i$$
$$= \sqrt{(x_u - x_j)^2 + (y_u - y_j)^2} - \sqrt{(x_u - x_i)^2 + (y_u - y_i)^2}.$$

Consequentially, the location of UE 302, $(X_\mu, Y_\mu)$, can be expressed as a function of cell coordinates and distance difference for any cell triplet (i, j, k) as:

$$(x_u, y_u) = \text{HYP}(x_i, y_i, x_j, y_j, x_k, y_k, d_{ji}, d_{ki}). \quad \text{(Eq. 2)}$$

Ideally, the intersections calculated from different combinations of cell/base station triplets given three or more cells/base stations should be identical, indicating the true UE position. However, in reality, there are various errors in the arguments of function HYP( ) in Eq. 2. These errors originate from multiple sources, including but not limited to, quantization error, NLOS error, data error, and calibration error.

For example, quantization error is inherent in time difference measurements because the granularity of time measurements in RRC report is one CDMA spreading chip (referred to herein as a chip). One chip error in time translates into roughly 78 meters in distance. With respect to NLOS error, multipath fading, especially in urban areas, could lead to inaccurate measurement of arrival times and introduce errors in the distance difference calculation. It is not very unusual to observe errors as high as hundreds of chips. With respect to data error, position information for the base station devices is retrieved from a pre-populated database which may be subject to human error.

Regarding calibration error, since cells within UMTS systems are not synchronized, the clock difference between two cells need to be estimated through some calibration process as mentioned earlier. Since the clocks can drift over time, the clock difference between any two cells should be updated frequently enough to address. In practical systems, UEs with known locations (e.g., with AGPS) are the main source of calibration estimation, the amount of which is generally limited. Consequently, clock difference calibration values are not always available for all cell pairs, and could be obsolete if the estimation has not been updated recently. As a result, calibration error is the dominant factor affecting the accuracy of UE positioning using TDOA methods.

For example, FIG. 4 presents another graphical representation 400 of hyperbolas generated based on TDOA measurement data received by UE 302 from three distinct base station devices $(X_j, Y_j)$, $(X_i, Y_i)$, and $(X_k, Y_k)$. However, graphical representation 400 demonstrates displacement of the hyperbolas presented in graphical representation 300 based on one or more or the errors mentioned above. Repetitive description of like elements employed in respective embodiments of graphical representations described herein are omitted for sake of brevity.

The various sources of measurement errors mentioned above could lead to deviated intersections from a UE's real location or even no feasible solution in the hyperbolic positioning processes. In accordance with (Eq. 2), in order to position UE 302 in association with signals received from three detected cells $(X_j, Y_j)$, $(X_i, Y_i)$, and $(X_k, Y_k)$ the intersection of any two hyperbola curves is determined. Ideally the calculated intersections are co-located and are independent of the chosen curves. However, if an input value (e.g., $d_{ki}$) is erroneous, the correct hyperbola will not be generated and the intersections would be "displaced."

For example, hyperbola $(d_{ki}=d_k,-d_i+\text{error})$ demonstrates a hyperbola resulting from one or more errors in measurement data used as inputs when calculating $d_{ki}$. As seen when comparing graphical representation 400 with graphical representation 300, as opposed to the single intersection point where UE 302 is located with respect to the measurement free curves $(d_{ji}=d_j,-d_i)$ and $(d_{ki}=d_k,-d_i)$ depicted in graphical representation 300, curves $(d_{ji}=d_j,-d_i)$ and $(d_{ki}=d_k,-d_i+\text{error})$ shown in graphical representation 400 have two intersection points 402 and 404. Neither intersection point 402 nor 404 is an accurate depiction of the position of UE 302.

FIG. 5 presents another graphical representation 500 of hyperbolas generated based on TDOA measurement data received by UE 302 one or more measurement errors mentioned above. Graphical representation 500 is an extension of graphical representation 400 and demonstrates the enhanced effect of measurement errors associated with hyperbolas generated based on signals received from four base station devices $(X_j, Y_j)$, $(X_i, Y_i)$, $(X_k, Y_k)$ and $(X_m, Y_m)$. Repetitive description of like elements employed in respective embodiments of graphical representations described herein are omitted for sake of brevity.

As previously mentioned, ideally, hyperbolas generated based on three or more base stations should have a common intersection point. However, due in part to the various measurement errors discussed above, a single common and accurate intersection point representative of the UE location (e.g., as exemplified in FIG. 3) is rarely realized. For example, graphical representation 500 includes additional hyperbolas $d_{jk}$, $d_{jm}$ and $d_{mk}$ generated in association with the addition of signals received by UE 302 from base station device $(X_m, Y_m)$. The multiple hyperbolas depicted in graphical representation 500 result in multiple intersection points. In addition to intersection points 402 and 404, graphical representation 500 includes intersection points 502, 504, 506, 508, 510, 512, and 514. Some of the intersection points are closer to the actual position of UE 302 than others. For example, intersection points 504 and 510 are relatively good indicators of the actual position of UE 302 while intersection points 508 and 404 are poor indicators of the actual position of UE 302.

As exemplified and discussed herein, intersections from TDOA calculations are subject to various errors. In certain circumstances, a small error in measurement may cause a large distance shift in the final result. The error sensitivity can also depend on the angle of two interacting curves, as well as the characteristic/shape of the hyperbolas. In an aspect, to enhance robustness of hyperbolic positioning, the subject UE locating methods employ TDOA data received from a UE based on three or more cells. Generally, with the subject method, the greater number of cell triplets employed in hyperbolic calculations, the greater the accuracy of the results. Thus in an aspect, the subject method determines hyperbola intersection points based on using every possible cell triplet combination taken the number of cells identified in an RRC report.

To further enhance robustness, the subject method aims to involve only the "reliable" intersection points determined using TDOA hyperbolic calculations. In order to determine how likely a hyperbola intersection point is reliable or not, the subject method employs a disturbance scrutiny technique to place hyperbola intersection point results (e.g., generated using Eq. 2) under sensitivity tests. Results failing the test are regarded as unreliable and only reliable intersections are used to determine a final estimated location of the UE. These tests involve introducing an "artificial" erroneous input value into the input data used to generate the original hyperbolic intersection points (e.g., based on the data received from a UE via a RRC report) and then performing a recalculation to generate comparative intersection points for each or the original intersection points. Those original intersection points which deviate from their corresponding recalculated comparison intersection point by more than a threshold value are regarded as sensitive to error. However, the intersection points that do not deviate from their corresponding recalculated comparative intersection points by more than the threshold value are regarded as robust. The sensitive intersection points are then discarded and the robust intersection points are kept for additional processing.

In an aspect, where two or more robust intersection points are determined following disturbance scrutiny, the additional processing involves root mean square (RMS) analysis of the robust intersection points to identify a single one of the intersection points from which to base an estimated position of the UE. In particular, the two or more robust intersection points are compared by their respective RMS values and the intersection point which minimizes the root mean squared error of the difference distances is selected.

Figure 6:
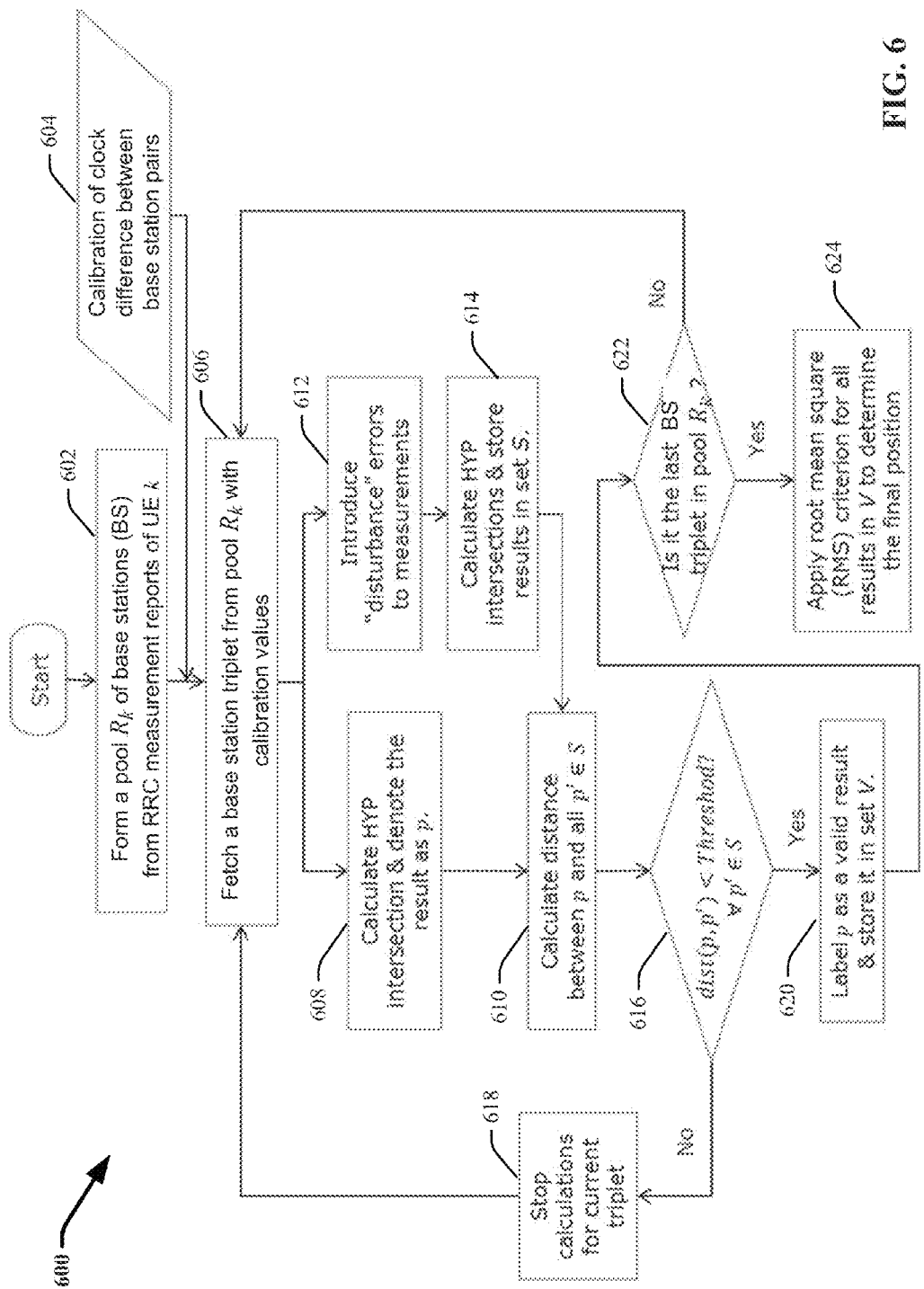
FIG. 6 presents a flow chart of an example process for determining a location of a mobile device using a TDOA calculation method with disturbance scrutiny in accordance with various aspects and embodiments described herein.

Referring now to FIG. 6 presented is a high level flow diagram of an example process 600 for determining a location of a UE using TDOA hyperbola calculations with disturbance scrutiny in accordance with various aspects and embodiments disclosed herein. Repetitive description of like elements employed in respective embodiments of systems and processes described herein are omitted for sake of brevity.

With respect to process 600, at 602 a pool $R_k$ of base stations (or cells) is formed from RRC measurement reports received from $UE_k$. The pool $R_k$ of base stations will include base stations from which $UE_k$ received signals, as identified in RRC measurement reports received from $UE_k$. Information regarding actual locations of the base stations of pool $R_k$ is also obtained (e.g., from an accessible database containing known locations of base station devices associated with the wireless network being evaluated). Information indicating calibrated clock differences between pairs of base stations included in pool $R_k$ is further obtained at 604 (e.g., as discussed with respect to calibration process 216 in association with FIG. 2).

In particular, clock differences between pairs of base stations included in pool $R_k$ are obtained by running process 600 (excluding step 604) using RRC data received from one or more test UEs for which precise locations are known (e.g., via AGPS or other reliable methods) and that includes TDOA signal information for each of the base stations included in $R_k$. Estimated locations for the one or more test UEs as determined via process 600 are then compared with the actual locations for the test UEs. It should be appreciated that the calibration process 604 can be performed concurrently or independently from process 600. For example, the calibration process 604 can run in a continuous fashion to routinely determine updated clock differences between pairs of base station devices included in a wireless network environment (e.g., wireless network environment 100).

Continuing with process 600, a plurality of distinct base station triplets (e.g., (i, j, k,), (i, j, m,), (j, k, m,), etc.) are generated based on the possible combinations of three base station devices from the pool of $R_k$. of base station devices. At 606, one of the base station triplets is selected. In addition, corresponding distance differences for pairs of base station devices (e.g., $d_{ji}$ and $d_{ki}$) included in the triplet are calculated using signal information indicating a difference in arrival time of signals that were received by $UE_k$ from the base station devices of the triplet, the known locations of the base station devices of the triplet, and calibrated clock differences of the base station pairs (e.g., pairs (j, i) and (k, i)). In an aspect, base station triplets are selected at random. In another aspect, base station pairs for which calibrated clock differences cannot be determined are skipped.

At 608, for the current triplet, the hyperbola intersection points are calculated using a closed form function hyperbola function (e.g., using Eq. 2) with original input data (e.g., signal information indicating a difference in arrival time of signals that were received by the $UE_k$ from the base station devices of the triplet, the known locations of the base station devices of the triplet, and calibrated clock differences of the base station pairs). Each triplet can generate up to two intersection points. In some cases, no intersection points are found. In other cases a single intersection point may be found. The original intersection points or points are denoted as intersection point(s) P, (where P can include 0, 1 or 2 points).

Meanwhile, disturbance scrutiny is performed at 612 by computing new comparative hyperbola intersection points using the closed form hyperbola function (Eq. 2) with a deliberately introduced measurement error into the original input data. Such a measurement error is referred to herein as a disturbance tolerance parameter. For example, the disturbance tolerance parameter can reflect an addition or subtraction of a distance amount (e.g., 1 chip, 1.5 chips, 2 chips, 5 chips, etc., wherein 1 CDMA spreading is about 78 meters in distances), to the differences of distances from the UE to the pairs of base station devices. The comparative intersection points, if any, are denoted as P' in set S.

At 610, distances between respective intersection points P and their corresponding intersection points P' in set S are determined. At 616, the original intersection points P are compared to their corresponding comparison intersection points P' in set S. Respective intersection points in P that deviate from their corresponding P' intersection points in set S by a distance greater than a threshold value are considered sensitive and discarded, and process 600 continues to step 618. Intersection points P that do not deviate from their corresponding P' intersection points in set S by a distance greater than the threshold value are considered valid/robust candidates for determining a position estimate for $UE_k$. Theses valid/robust intersection points (if any) are then stored in solution set V at step 620, and process 600 continues to step 622.

When continuing with step 618, calculations for the current triplet are stopped and process 600 is continued with return to step 606 with a new base station triplet selected from pool $R_k$. Similarly, when continuing with step 622, if the current base station triplet is not the last triplet in pool $R_k$, process 600 is continued with return to step 606 with a new base station triplet selected from pool $R_k$. Process 600 is repeated (e.g., starting at step 606) until all the triplets in pool $R_k$ have been processed. Finally, if at 622 the current base station triplet is the last triplet in pool $R_k$, process 600 continues to step 624.

At 624, if solution set V includes one or more candidate intersection points, the RMS values of the respective candidate intersection points are calculated. In aspect, the single candidate intersection point in set V with the minimum root mean squared error of the difference distances is selected as to represent an estimated location of $UE_k$. In another aspect, a RMS cutoff threshold can be applied to further scrutinize selection of a candidate intersection point to represent an estimated location of $UE_k$. According to this aspect, the RMS value associated with the intersection point that minimizes the root mean squared error of the difference distances (e.g., the minimal RMS value) is compared to a maximum RMS threshold value. If the RMS value associated with the intersection point that minimizes the root mean squared error of the difference distances is less than or equal to the maximum RMS threshold value (e.g., is smaller than the RMS cutoff threshold), the intersection point determined to be the valid estimation of the location of $UE_k$. Otherwise, no estimate is returned (e.g., a solution of no yield). Still in another aspect, where two or more candidate intersection points have the same minimal RMS value, a tie breaker is applied whereby the intersection point that is closest to a base station device, of the bases included in pool $R_k$, associated with a strongest received signal code power (RSCP), is selected.

In summary, process 600 employs the traditional hyperbolic positioning processes (e.g., Eq. 2), inheriting the computational efficiency advantage of the algorithm, but extends it to beyond three cells. To make the various embodiments robust to inevitable measurement errors, a disturbance scrutiny technique is added to the hyperbolic positioning process. The subject disturbance scrutiny technique involves deliberately introducing a "disturbance" into the input measurements and then checking the robustness of the results. Unreliable results are discarded and reliable ones are compared by their root mean square (RMS) values to get the optimal solution. With disturbance scrutiny and RMS selection, the subject method eliminates intersection points that are highly sensitive to input errors. Although, the selection aspect of the subject method can lower the result yield of the traditional hyperbolic positioning methods to some extent, it significantly improves the accuracy of location estimates. This is especially beneficial for systems with persistent input errors, such as UMTS networks.

FIG. 7 presents a chart 700 outlining another example process for determining a location of a mobile device using TDOA hyperbola calculations with disturbance scrutiny in accordance with various aspects and embodiments disclosed herein. The process described via chart 700 is a more detailed explanation of the subject disturbance scrutiny method described in process 600. Repetitive description of like elements employed in respective embodiments of systems and processes described herein are omitted for sake of brevity.

In accordance with chart 700, given TDOA signal information received by a UE from a base station/cell triplet (i, j, k) the distance differences $d_{ji}$ and $d_{ki}$ are determined. An intersection point representative of the UE's position (x, y) is then calculated using Eq. 2 with the distance differences as inputs. A disturbance tolerance parameter (e.g., an error value) $\epsilon_{ji}$ (and $\epsilon_{ki}$) is then introduced into the input measurements for $d_{ji}$ (and $d_{ki}$) and a comparison intersection point is recalculated as follows, $$(x_{new}, y_{new}) = HYP(x_i, y_i, x_j, y_j, x_k, y_k, d_{ji}+\epsilon_{ji}, d_{ki}+\epsilon_{ki}). \quad (Eq.\ 3)$$

The position displacement due to the disturbance is given by:

$$\Delta d = \sqrt{(x_{new}-x)^2 + (y_{new}-y)^2} = f(\epsilon_{ji}, \epsilon_{ki}). \quad (Eq.\ 4)$$

The closed form expression of $f(\epsilon_{ji}, \epsilon_{ki})$ can be derived, but it is in rather complex form. The numerical solution, on the contrary, is straightforward to obtain. In various embodiments, disturbance errors to $d_{ji}$ and $d_{ki}$ are introduced by letting $(\epsilon_{ji}, \epsilon_{ki}) = (\epsilon, 0), (-\epsilon, 0), (0, \epsilon)$ and $(0, -\epsilon)$ in turn for some small $\epsilon > 0$. If a disturbance tolerance parameter causes a displacement $\Delta d$ larger than a certain threshold, the original intersection (x, y) will be considered highly sensitive to disturbances. It is then labeled as "unreliable" and prohibited from further processing.

The process defined in chart 700 can be employed to estimate a location of a UE from which TDOA signal information has been received from three or more cells. At step 1, two pairs of cells associated with a cell triplet are selected for processing. This is exemplified in chart 700 in which cell pairs j) and (i, k) associated with cell triplet (i, j, k) are identified and measurements $d_{ji}$ and $d_{ki}$ for the distance differences from the UE to the respective cell pairs is determined. At step 2, hyperbola calculations are performed (e.g., using Eq. 2). If no intersection points are found as a result of the hyperbola calculations, the process returns to step 1 and selects new pairs of cells for evaluation. Otherwise if there are one or two intersection points, the process proceeds to step 3. Without loss of generality, the process described via chart 700 assumes two intersection points $(x_1, y_1)$, $(x_2, y_2)$.

At step 3, a small measurement disturbance tolerance parameter >0 to $d_{ji}$ is introduced such that $\hat{d}_{ji} + d_{ji} + \epsilon$ and hyperbola calculations (e.g., using Eq. 2) are re-calculated using $\hat{d}_{ji}$ and $d_{ki}$ as inputs. If no intersection points are found, the process returns to step 1 for evaluation of other pairs of cells. Otherwise if there are one or two intersection points, the process proceeds to step 4. Without loss of generality, the process described via chart 700 assumes two intersection points $(\hat{x}_1, \hat{y}_1)$ and $(\hat{x}_2, \hat{y}_2)$, are identified in step 3.

At step 4, the differences between $(x_1, y_1)$ and its comparative point $(\hat{x}_1, \hat{y}_1)$ is determined using the following equation $$\min_i\{\sqrt{(\hat{x}_i - x_1)^2 + (\hat{y}_i - y_1)^2}\} > T_\epsilon \qquad \text{(Eq. 5)}$$

where $T_\epsilon$ is an empirical error tolerance threshold obtained from various tests. If this threshold is exceeded, $(x_1, y_1)$ is determined to be disturbance sensitive. If this threshold is not exceeded, $(x_1, y_1)$ is labeled as non-sensitive. The same checking and labeling for described in step 4 is performed for $(x_2, y_2)$ as well. If both $(x_1, y_1)$ and $(x_2, y_2)$ are labeled as sensitive, the process returns to step 1 for evaluation of other pairs of cells. Otherwise, steps 3 to 4 are repeated on the non-sensitive result(s) with the change of $\epsilon$ to $-\epsilon$.

If there are any non-sensitive results remaining following repeat of steps 3 and 4 with the change of $\epsilon$ to $-\epsilon$, the process continues to step 6. At step 6, steps 3 to 5 are repeated, by changing the application of the disturbance tolerance parameter >0 to $d_{ki}$ instead of $d_{ji}$. After step 6, any of $(x_i, y_1)$ or $(x_2, y_2)$ that is labeled as non-sensitive, is regarded as disturbance scrutiny. At step 7, steps 1-6 are repeated until all cell pairs are exhausted by the disturbance scrutiny. At step 8, all non-sensitive intersection points surviving disturbance scrutiny steps 1-6 are evaluated under RMS analysis to identify one of the surviving intersection points to represent an estimated location of the UE.

When a UE observes n (n≥3) distinct cells, there are n(n−1)(n−2)/6 combinations of cell triplet (i, j, k). Every cell triplet (i, j, k) could generate up to two intersection points (e.g., $(x_1, y_1)$ and $(x_2, y_2)$) after disturbance scrutiny. It is unlikely for all the surviving or non-sensitive intersections points to share a common spot. The RMS selection process compares different intersections and determine the best candidate. RMS analysis involves determining the root mean squared error of the differences of distances for each respective surviving intersection point. The intersection point having the lowest RMS value (that meets a threshold cut off minimum value if one is applied), is regarded as the best estimate of the UE's location. RMS selection as applied to the subject UE locating process is mathematically described as follows.

For any location intersection point (x, y), define $d(x, y, i) = \sqrt{(x-x_i)^2 - (y-y_i)^2}$ as its distance to cell i located at $(x_i, y_i)$. For a UE, given a set M of cell pairs (i, j) and the corresponding distance difference $d_{ji}$, the RMS error of this point is defined as:

$$RMS(x, y) = \sqrt{\frac{\sum_{\forall (i,j) \in P}^* (d(x, y, j) - d(x, y, i) - d_{ji})^2}{N}}, \qquad \text{(Eq. 6)}$$

where N is the total number of distinct cell pairs in the set M. In fact, RMS reflects the deviation between distance difference d(x, y, j)−d(x, y, i) and observed $d_{ji}$ for that UE. Ideally, the RMS value for the true UE position should be minimal.

The collection of all non-sensitive intersections derived from cell triplets observed by the UE can be denoted as I. The RMS values for the respective intersection points included in set I are then determined the position (x*, y*) the minimal RMS(x, y) is chosen as the best UE location estimate, i.e., $$(x^*, y^*) = \arg\min_{(x,y) \in I} RMS(x, y). \qquad \text{(Eq. 7)}$$

There are chances that multiple intersections with the same RMS value are found (e.g RMS(x, y)=0, $\forall$(x, y)∈I if only three cells are detected by the UE). In this case, the intersection point that is closest to the cell with strongest received signal code power (RSCP) is selected as the best UE location estimate. In an aspect, the RSCP measurements are included in the RRC reports received from the UE. In another aspect, when the measurement errors are significant, even the minimal RMS(x*, y*) could be very large, making the solution appear unrealistic. It is risky to take such a solution as good estimation of the UE position. Thus in an aspect, a RMS cutoff threshold is applied. When the threshold is exceeded, the solution (x*, y*) is discarded and a location estimate for the UE is not established.

Figure 8:
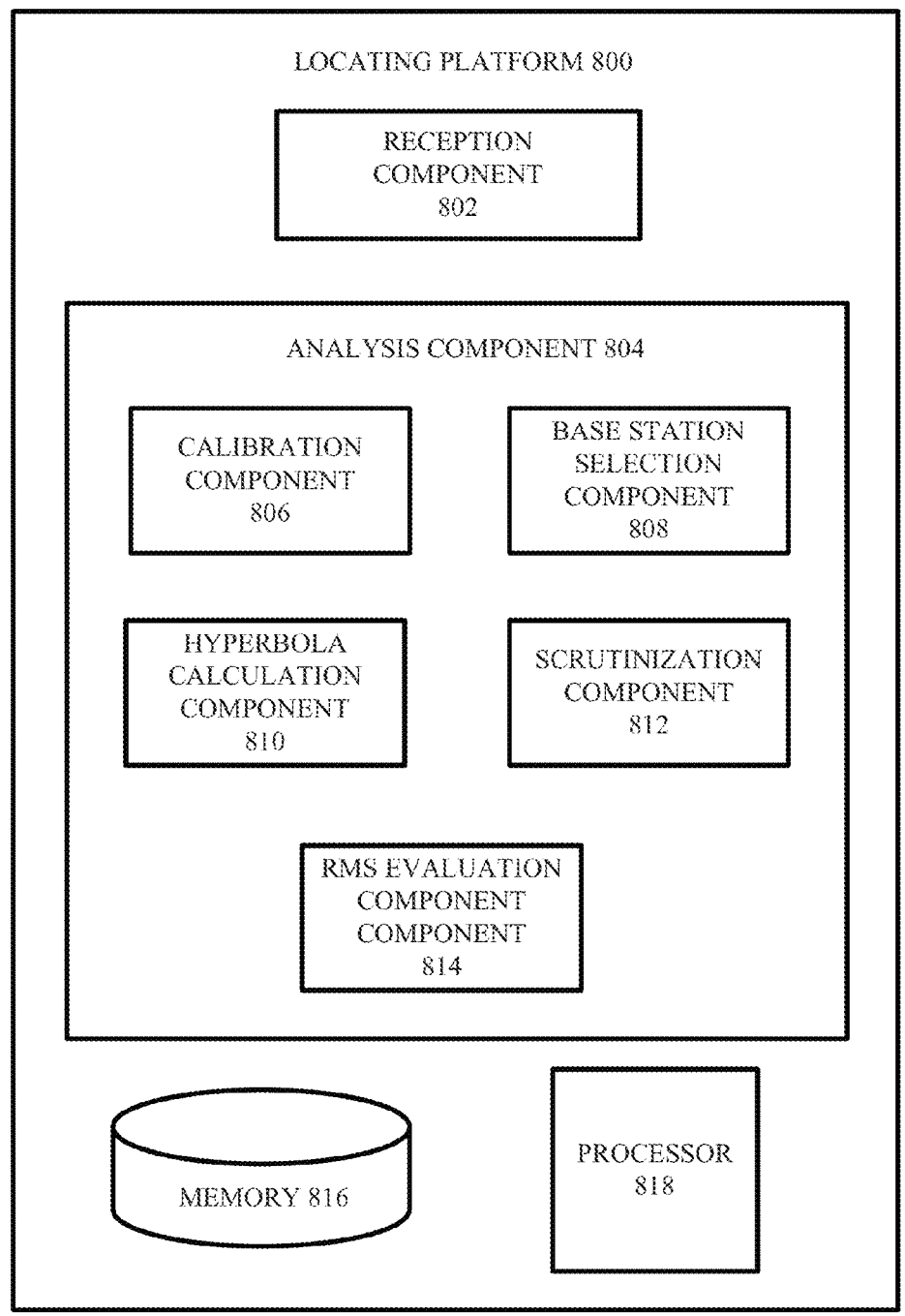
FIG. 8 illustrates an example locating platform that facilitates determining a location of a mobile device using a TDOA calculation method with disturbance scrutiny in accordance with various aspects and embodiments described herein.

FIG. 8 presents an example locating platform 800 that facilitates determining a location of a mobile device in a wireless network using TDOA hyperbola calculations with disturbance scrutiny in accordance with various aspects and embodiments disclosed herein. Locating platform can include same or similar aspects as locating platform 106. Repetitive description of like elements employed in respective embodiments of systems and processes described herein are omitted for sake of brevity.

Locating platform 800 is configured to perform the subject TDOA hyperbola calculations with disturbance scrutiny. Locating platform 800 can include reception component 802 and analysis component 802. Locating platform 800 further includes memory 816 for storing computer executable components and instructions. Locating platform 800 can further include a processor 818 to facilitate operation of the instructions (e.g., computer executable components and instructions) locating platform 800.

Reception component 802 is configured to receive RRC reports from one or more UEs in a wireless network environment (e.g., wireless network environment 100). In particular, reception component 802 is configured to receive signal information (e.g., included in an RRC report) indicating a difference in arrival time of signals that were received by the device from a number of base station devices. In an aspect, an RRC report can include RSCP information.

Analysis component 804 is configured to perform the various aspects of the subject UE locating process using TDOA hyperbola calculations with disturbance scrutiny. Calibration component 806 is configured to determine clock differences between base station devices/cells from which a UE has identified in an RRC report as a cell from which it has received a signal in accordance with calibration process 216 or 604. Base station selection component 808 is configured to identify base station triplets, and respective base station pairs associate therewith, for which to apply hyperbola calculations and disturbance scrutiny. In an aspect, base station component 808 generates all possible combinations of cell triplets based on those cells identified in the RRC report.

For each cell triplet, hyperbola calculation component 810 is configured to determine differences of distances between the UE and base station pairs included in the triplet based on TDOA signal information included in the RRC report, information identifying locations of the base stations, and the calibrated clock differences. Hyperbola calculation component 810 further generates generate curve information representing hyperbolic curves generated using a closed form function (e.g., Eq. 2) with input values based on the differences of distances. Hyperbola calculation component then determines intersection points in the hyperbolic curves.

Scrutinization component 812 is configured to select a subset of the intersection points output by hyperbola calculation component 810 that are associated with a degree of resistance to measurement errors associated with the input values using the disturbance scrutiny process disclosed herein. Lastly, RMS analysis component 814 is configured to apply RMS analysis against respective intersection points included in the subset and select one of the intersection points that minimizes the root mean squared error of the differences of distances to represent an estimated location of the UE.

Although the components of locating platform 800 are depicted as "co-located," it should be appreciated that various aspects of locating platform can be associated with a distributed computing environment. For example, the calibration process can be associated with a separate dedicated server. According to this aspect, a version of analysis component 804 including calibration component 806 can be located a first device while a version of analysis component 804 excluding calibration component can be provided at a second device. In addition, information employed by locating platform 800 (e.g., executable instructions or components, known values, constants, cell location information, clock differences between cells, etc.) can be located internally (e.g., in memory 818) or accessed at a remote database (e.g., via a network).

Figure 9:
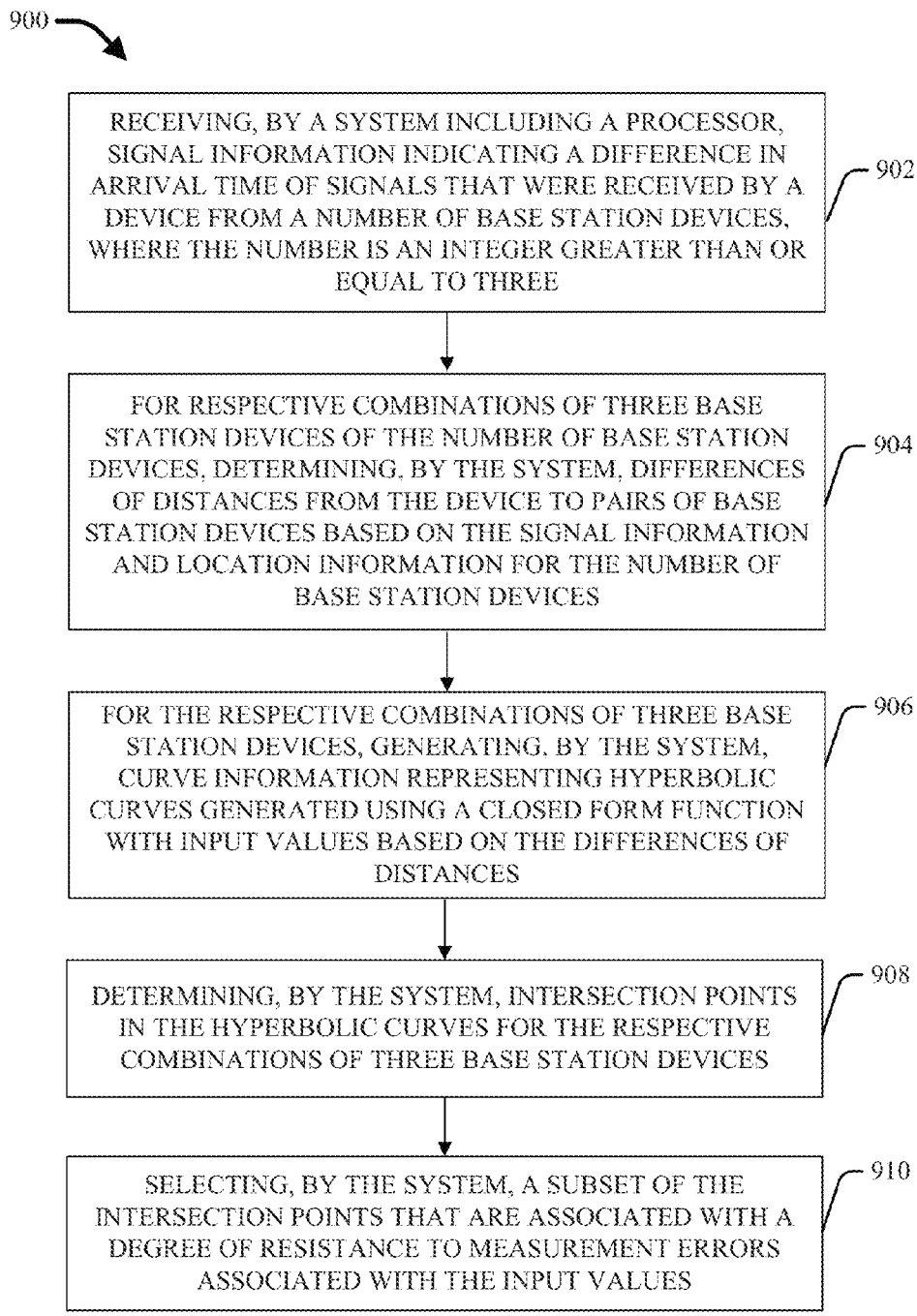
FIG. 9 illustrates an example method for determining a location of a mobile device using a TDOA calculation method with disturbance scrutiny in accordance with various aspects and embodiments described herein.
Figure 10:
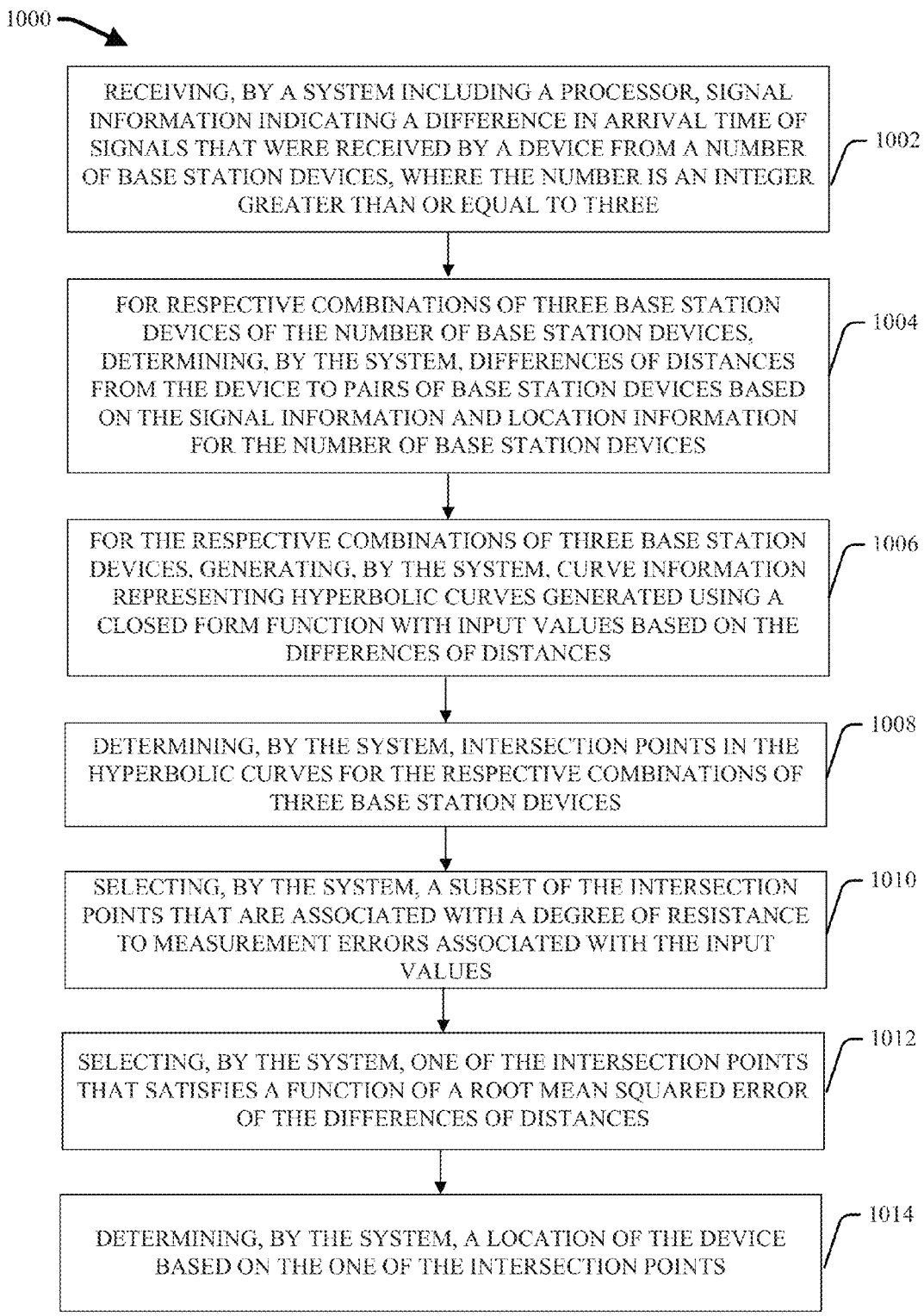
FIG. 10 illustrates another example method for determining a location of a mobile device using a TDOA calculation method with disturbance scrutiny in accordance with various aspects and embodiments described herein.

In view of the example systems and/or devices described herein, example methods that can be implemented in accordance with the disclosed subject matter can be further appreciated with reference to flowcharts in FIGS. 9-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 9 illustrates a flow chart of an example method 900 for determining a location of a mobile device using TDOA hyperbola calculations with disturbance scrutiny in accordance with various aspects and embodiments disclosed herein. At 902, signal information is received by a system including a processor. (e.g., locating platform 106 associated with a service provider network 102). The system signal information indicates a difference in arrival time of signals that were received by a device from a number of base station devices, where the number is an integer greater than or equal to three. At 904, for respective combinations of three base station devices of the number of base station devices, the system determines differences of distances from the device to pairs of base station devices based on the signal information and location information for the number of base station devices. At 906, for the respective combinations of three base station devices, the system then generates curve information representing hyperbolic curves generated using a closed form function with input values based on the differences of distances. At 908, the system determines intersection points in the hyperbolic curves for the respective combinations of three base station devices, and at 910, the system selects a subset of the intersection points that are associated with a degree of resistance to measurement errors associated with the input values.

FIG. 10 illustrates a flow chart of another example method 1000 for determining a location of a mobile device using TDOA hyperbola calculations with disturbance scrutiny in accordance with various aspects and embodiments disclosed herein. At 1002 signal information is received by a system including a processor. (e.g., locating platform 106 associated with a wireless service provider 102). The system signal information indicates a difference in arrival time of signals that were received by a device from a number of base station devices, where the number is an integer greater than or equal to three. At 1004, for respective combinations of three base station devices of the number of base station devices, the system determines differences of distances from the device to pairs of base station devices based on the signal information and location information for the number of base station devices. At 1006, for the respective combinations of three base station devices, the system then generates curve information representing hyperbolic curves generated using a closed form function with input values based on the differences of distances. At 1008, the system determines intersection points in the hyperbolic curves for the respective combinations of three base station devices, and at 1010, the system selects a subset of the intersection points that are associated with a degree of resistance to measurement errors associated with the input values. At 1012, the system selects one of the intersection points that satisfies a function of a root mean squared error of the differences of distances, and at 1014, the system determines a location of the device based on the one of the intersection points.

Figure 11:
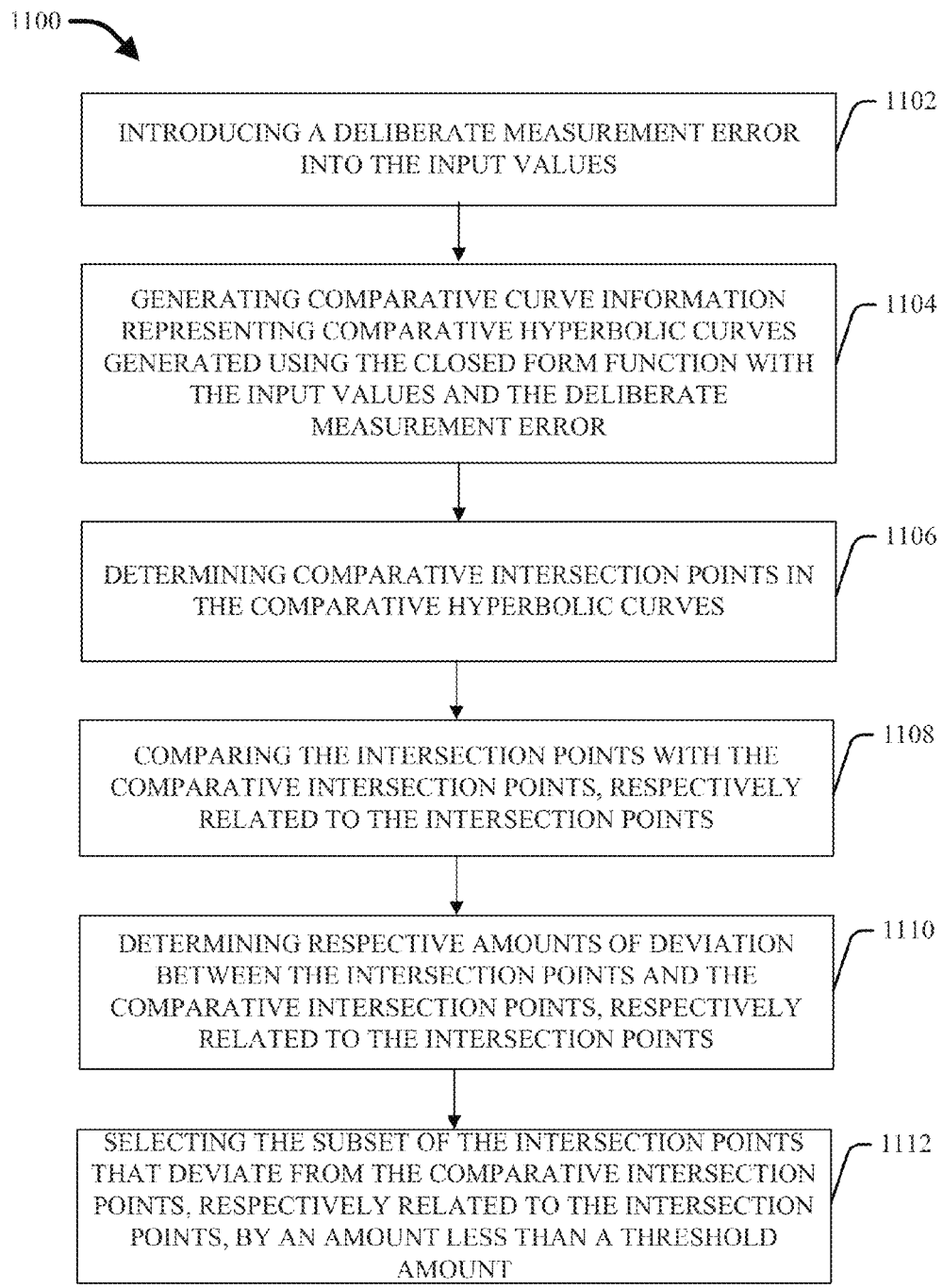
FIG. 11 illustrates another example disturbance scrutiny process in accordance with various aspects and embodiments described herein.

FIG. 11 illustrates a flow chart of an example method 1100 for selecting a subset intersection points that are associated with a degree of resistance to measurement errors associated with input values employed in TDOA based hyperbolic positioning processes in accordance with various aspects and embodiments disclosed herein. Method 1100 is an elaboration of steps 910 and 1010 of methods 900 and 1000 respectively. Method 1100 is employed for each base station triplet included in the total number of base stations.

At 1102, the system introduces a deliberate measurement error into the input values. At 1104, the system generates comparative curve information representing comparative hyperbolic curves generated using the closed form function with the input values and the deliberate measurement error. At 1106, the system determines comparative intersection points in the comparative hyperbolic curves. At 1108, the system compares the intersection points with the comparative intersection points, respectively related to the intersection points. At 1110, the system determines respective amounts of deviation between the intersection points and the comparative intersection points, respectively related to the intersection points. At 1112, the system selects the subset of the intersection points that deviate from the comparative intersection points, respectively related to the intersection points, by an amount less than a threshold amount.

Figure 12:
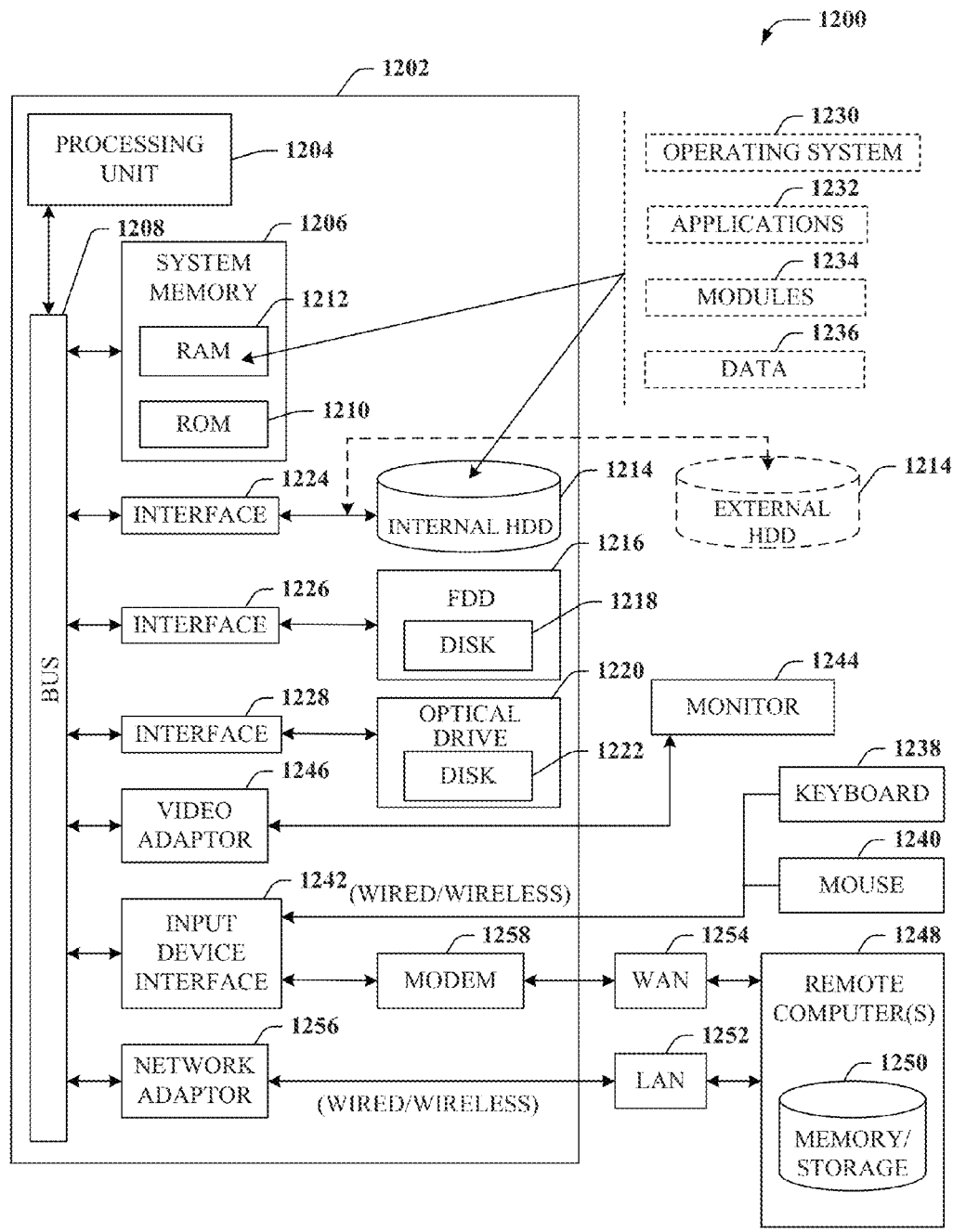
FIG. 12 is a schematic block diagram illustrating a suitable operating environment in accordance with various aspects and embodiments.
Figure 13:
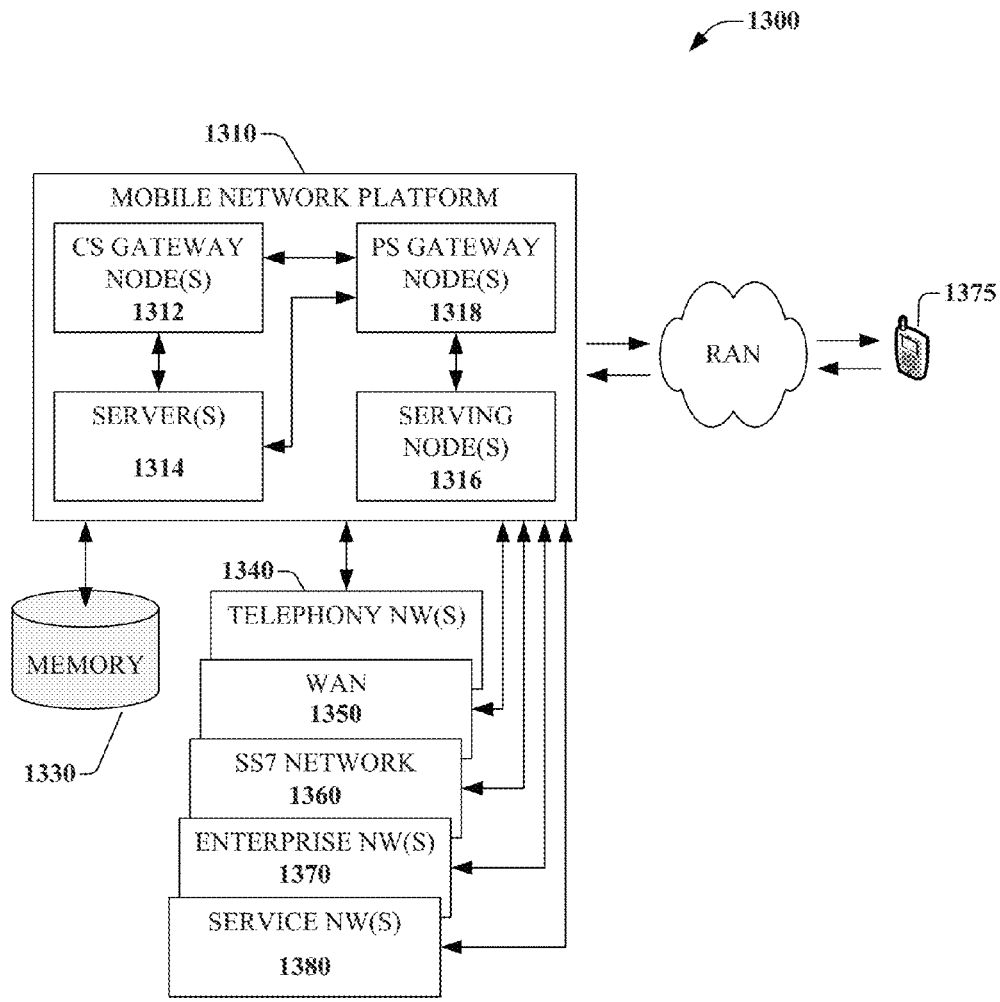
FIG. 13 is a schematic block diagram of a sample-computing environment in accordance with various aspects and embodiments.

The subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that performs particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., smartphone, PDA, electronic tablets or pads, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Referring now to FIG. 12, there is illustrated a block diagram of a computing environment in accordance with various aspects described herein. For example, in some embodiments, the computer can be or be included within the locating platforms 106 and 800 described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and Institute of Electrical and Electronics Engineers (IEEE) 12104 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 13124 serial port, a game port, a universal serial bus (USB) port, an IR interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless AP disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54

Mbps (802.11b) data rate, for example or with products that contain both bands (dual band), so the networks can provide real-world performance similar to the basic 15BaseT wired Ethernet networks used in many offices.

FIG. 13 presents an example embodiment 1300 of a mobile network platform 1310 that can implement and exploit one or more aspects of the disclosed subject matter described herein. Generally, wireless network platform 1310 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1310 can be included in telecommunications carrier networks, and can be considered carrier-side components as discussed elsewhere herein. Mobile network platform 1310 includes CS gateway node(s) 1312 which can interface CS traffic received from legacy networks like telephony network(s) 1340 (e.g., public switched telephone network (PSTN), or public land mobile network (PLMN)) or a signaling system #7 (SS7) network 1370. Circuit switched gateway node(s) 1312 can authorize and authenticate traffic (e.g., voice) arising from such networks. Additionally, CS gateway node(s) 1312 can access mobility, or roaming, data generated through SS7 network 1370; for instance, mobility data stored in a visited location register (VLR), which can reside in memory 1330. Moreover, CS gateway node(s) 1312 interfaces CS-based traffic and signaling and PS gateway node(s) 1318. As an example, in a 3GPP UMTS network, CS gateway node(s) 1312 can be realized at least in part in gateway GPRS support node(s) (GGSN). It should be appreciated that functionality and specific operation of CS gateway node(s) 1312, PS gateway node(s) 1318, and serving node(s) 1316, is provided and dictated by radio technology(ies) utilized by mobile network platform 1310 for telecommunication.

In addition to receiving and processing CS-switched traffic and signaling, PS gateway node(s) 1318 can authorize and authenticate PS-based data sessions with served mobile devices. Data sessions can include traffic, or content(s), exchanged with networks external to the wireless network platform 1310, like wide area network(s) (WANs) 1350, enterprise network(s) 1370, and service network(s) 1380, which can be embodied in local area network(s) (LANs), can also be interfaced with mobile network platform 1310 through PS gateway node(s) 1318. It is to be noted that WANs 1350 and enterprise network(s) 1360 can embody, at least in part, a service network(s) like IP multimedia subsystem (IMS). Based on radio technology layer(s) available in technology resource(s) 1317, packet-switched gateway node(s) 1318 can generate packet data protocol contexts when a data session is established; other data structures that facilitate routing of packetized data also can be generated. To that end, in an aspect, PS gateway node(s) 1318 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1300, wireless network platform 1310 also includes serving node(s) 1316 that, based upon available radio technology layer(s) within technology resource(s) 1317, convey the various packetized flows of data streams received through PS gateway node(s) 1318. It is to be noted that for technology resource(s) 1317 that rely primarily on CS communication, server node(s) can deliver traffic without reliance on PS gateway node(s) 1318; for example, server node(s) can embody at least in part a mobile switching center. As an example, in a 3GPP UMTS network, serving node(s) 1316 can be embodied in serving GPRS support node(s) (SGSN).

For radio technologies that exploit packetized communication, server(s) 1314 in wireless network platform 1310 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1310. Data streams (e.g., content(s) that are part of a voice call or data session) can be conveyed to PS gateway node(s) 1318 for authorization/authentication and initiation of a data session, and to serving node(s) 1316 for communication thereafter. In addition to application server, server(s) 1314 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1310 to ensure network's operation and data integrity in addition to authorization and authentication procedures that CS gateway node(s) 1312 and PS gateway node(s) 1318 can enact. Moreover, provisioning server(s) can provision services from external network(s) like networks operated by a disparate service provider; for instance, WAN 1350 or Global Positioning System (GPS) network(s) (not shown). Provisioning server(s) can also provision coverage through networks associated to wireless network platform 1310 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1375.

It is to be noted that server(s) 1314 can include one or more processors configured to confer at least in part the functionality of macro network platform 1310. To that end, the one or more processor can execute code instructions stored in memory 1330, for example. It is should be appreciated that server(s) 1314 can include a content manager 1315, which operates in substantially the same manner as described hereinbefore.

In example embodiment 1300, memory 1330 can store information related to operation of wireless network platform 1310. Other operational information can include provisioning information of mobile devices served through wireless platform network 1310, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1330 can also store information from at least one of telephony network(s) 1340, WAN 1350, enterprise network(s) 1360, or SS7 network 1370. In an aspect, memory 1330 can be, for example, accessed as part of a data store component or as a remotely connected memory store.

In the subject specification, terms such as "store," "storage," "data store," "data storage," "database," and substantially any other information storage component relevant to operation and functionality of a component, refer to "memory components," or entities embodied in a "memory"

or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      receiving, from a device, signal information indicating a difference in arrival time of signals that were received by the device from a number of base station devices, wherein the number is an integer greater than two;
      for respective combinations of three base station devices of the number of base station devices, generating curve information representing hyperbolic curves generated using a closed form function with input values based on differences of distances from the device to pairs of base station devices of the respective combinations of three base station devices, wherein the differences of distances are based on the signal information and location information for the number of base station devices;
      determining intersection points in the hyperbolic curves for the respective combinations of three base station devices;
      for the respective combinations of three base station devices, introducing a deliberate measurement error into the input values resulting in modified input values;
      generating comparative curve information representing comparative hyperbolic curves generated using the closed form function with the modified input values;
      determining comparative intersection points in the comparative hyperbolic curves that respectively correspond to the intersection points; and
      selecting a group of the intersection points that are associated with a degree of resistance to measurement errors associated with the input values based on respective amounts of deviation between the intersection points and the comparative intersection points.

2. The system of claim 1, wherein the operations further comprise:
   determining a location of the device based on the group of the intersection points.

3. The system of claim 2, wherein the determining the location of the device comprises selecting one of the intersection points of the group of the intersection points that satisfies a function of a root mean squared error of the differences of distances.

4. The system of claim 1, wherein the selecting the group of the intersection points further comprises, selecting the group of the intersection points based on the respective amounts of deviation being determined to be less than a threshold amount.

5. The system of claim 1, wherein the differences of distances are based on time differences of signals traveling from the respective pairs of base station devices and calibrated clock differences between the respective pairs of base station devices.

6. The system of claim 5, wherein the device is a first device and the signal information is first signal information, and wherein the operations further comprise:
   determining the calibrated clock differences based on second signal information indicating a difference in arrival time of signals that were received by a second device from the number of base station devices, wherein the second device is associated with a known location; and
   performing the operations using the second signal information.

7. The system of claim 1, wherein the system communicates according to a universal mobile telecommunication system protocol.

8. The system of claim 1, wherein the number of base station devices is greater than three.

9. The system of claim 1, wherein the determining the location of the device comprises:
   selecting one of the group of intersection points that is closest to a base station device of the number of base station devices associated with a strongest power of received signal code.

10. A method, comprising:
    receiving, by a system comprising a processor, signal information indicating a difference in arrival time of signals that were received by a device from a number of base station devices, wherein the number is an integer greater than two;
    for respective combinations of three base station devices of the number of base station devices,
       determining, by the system, differences of distances from the device to pairs of base station devices of the respective combinations of three base station devices based on the signal information and location information for the number of base station devices, generating, by the system, curve information representing hyperbolic curves generated using a closed form function with input values based on the differences of distances, determining, by the system, intersection points in the hyperbolic curves;

adding, by the system, a deliberate measurement error into the input values resulting in error added input values, generating, by the system, comparative curve information representing comparative hyperbolic curves generated using the closed form function with the error added input values, determining, by the system, comparative intersection points in the comparative hyperbolic curves that respectively correspond to the intersection points, and selecting, by the system, points of the intersection points that are associated with a determined degree of resistance to measurement errors associated with the input values based on respective amounts of deviation between the intersection points and the comparative intersection points.

11. The method of claim 10, further comprising:
determining, by the system, a location of the device based on the points of the intersection points.

12. The method of claim 11, wherein the determining the location of the device comprises selecting one of the intersection points that satisfies a function of a root mean squared error of the differences of distances.

13. The method of claim 10, wherein the selecting the points of the intersection points further comprises selecting the points of the intersection points based on the respective amounts of deviation being determined to be less than a threshold amount.

14. The method of claim 10, wherein the determining the differences of distances further comprises determining the differences of distances based on time differences of signals traveling from the respective pairs of base station devices and calibrated clock differences between the respective pairs of base station devices.

15. The method of claim 14, wherein the device is a first device and the signal information is first signal information, the method further comprising:
determining the calibrated clock differences based on second signal information indicating a difference in arrival time of signals that were received by a second device from the number of base station devices, wherein the second device is associated with a known location; and
performing the operations using the second signal information.

16. A computer-readable storage device comprising computer-readable instructions that, in response to execution, cause a system comprising a processor to perform operations comprising:

receiving, from a device, signal information indicating a difference in arrival time of signals that were received by the device from base station devices comprising at least three base stations;

for respective combinations of three base station devices of the base station devices, generating curve information representing hyperbolic curves generated using a closed form function with input values based on differences of distances from the device to pairs of base station devices of the respective combinations of three base station devices, wherein the differences of distances are based on the signal information and location information for the base station devices;

determining intersection points in the hyperbolic curves for the respective combinations of three base station devices;

introducing a measurement error into the input values resulting in changed input values;

for the respective combinations of three base station devices, generating comparative curve information representing comparative hyperbolic curves generated using the closed form function with the changed input values; and determining comparative intersection points in the comparative hyperbolic curves that respectively correspond to the intersection points;

selecting ones the intersection points that are associated with a determined degree of resistance to measurement errors associated with the input values resulting in selected intersection points, based on respective amounts of deviation between the intersection points and the comparative intersection points; and determining a location of the device based on the selected intersection points.

17. The computer readable storage device of claim 16, wherein the determining the location of the device further comprises selecting one of the intersection points that satisfies a function of a root mean squared error of the differences of distances.

18. The computer readable storage device of claim 16, wherein the selecting the ones of the intersection points further comprises selecting the ones of the intersection points based on the respective amounts of deviation being determined to satisfy a defined function.

19. The computer readable storage device of claim 16, wherein the differences of distances is based on time differences of signals traveling from the respective pairs of base station devices and calibrated clock differences between the respective pairs of base station devices.

20. The computer readable storage device of claim 19, wherein the device is a first device and the signal information is first signal information, the operations further comprising:
determining the calibrated clock differences based on second signal information indicating a difference in arrival time of signals that were received by a second device from the number of base station devices, wherein the second device is associated with a known location; and
performing the operations using the second signal information.

* * * * *